United States Patent [19]

Witmer et al.

[11] 4,120,624
[45] Oct. 17, 1978

[54] APPARATUS FOR AND METHOD OF FORMING FOOD PRODUCT INTO A STRIP OR RIBBON

[75] Inventors: Clinton C. Witmer; Frank M. Tate, both of Modesto, Calif.

[73] Assignee: Tri/Valley Growers, San Francisco, Calif.

[21] Appl. No.: 775,557

[22] Filed: Mar. 8, 1977

[51] Int. Cl.² .......................... B29D 7/00; A23P 1/00
[52] U.S. Cl. ..................................... 425/71; 425/224; 425/373; 425/404
[58] Field of Search .................. 425/71, 66, 224, 362, 425/373, 242, 404

[56] References Cited

U.S. PATENT DOCUMENTS

| 2,534,629 | 12/1950 | Schultze | 425/71 |
| 3,240,853 | 3/1966 | Shichman | 425/224 X |
| 4,012,188 | 3/1977 | Lemelson | 425/373 |

FOREIGN PATENT DOCUMENTS

| 1,066,624 | 4/1967 | United Kingdom | 425/71 |
| 1,102,184 | 2/1968 | United Kingdom | 425/373 |

Primary Examiner—Francis S. Husar
Assistant Examiner—William R. Briggs
Attorney, Agent, or Firm—Edward B. Gregg

[57] ABSTRACT

Apparatus including a casting wheel and a tank of calcium chloride solution for forming a paste-like food product into a ribbon, and method of forming ribbon.

2 Claims, 6 Drawing Figures

U.S. Patent Oct. 17, 1978 Sheet 2 of 2 4,120,624
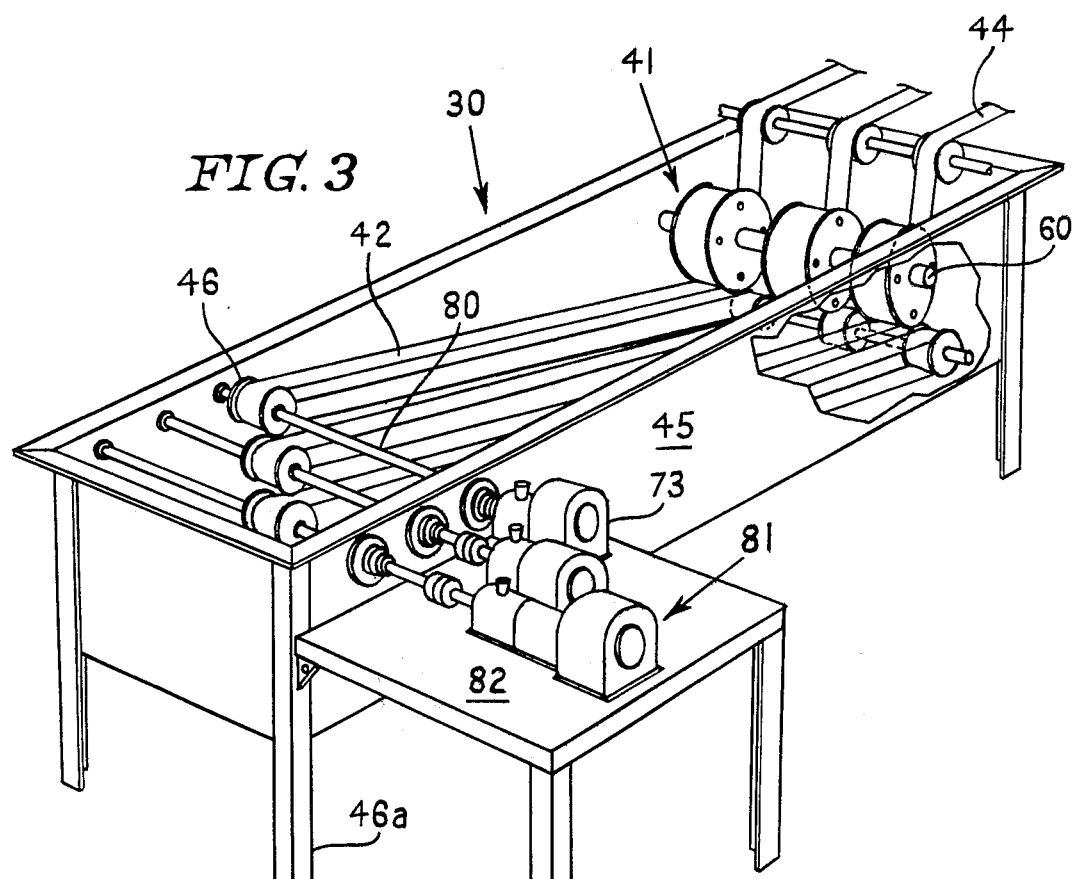
FIG. 3
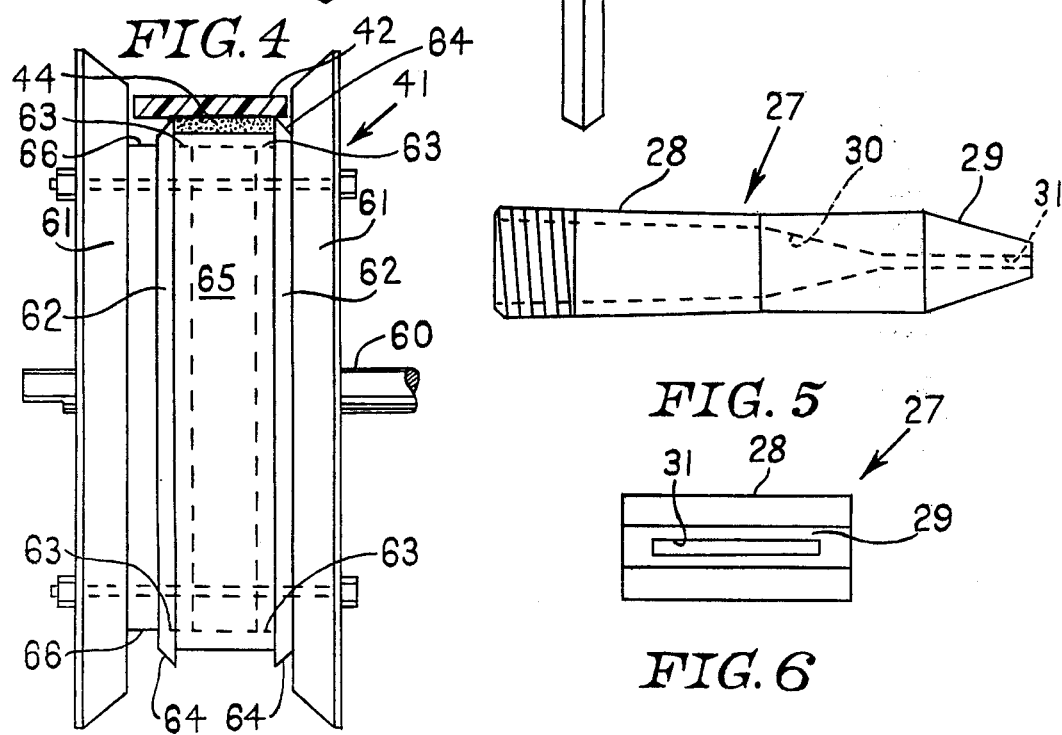
FIG. 4
FIG. 5
FIG. 6

APPARATUS FOR AND METHOD OF FORMING FOOD PRODUCT INTO A STRIP OR RIBBON

This invention relates to an apparatus and a method for forming a paste-like, gellable food product, such as pimiento material, into a ribbon for feeding to a stuffing machine. The invention will be first described with particular reference to the preparation of a ribbon of pimiento material for stuffing of olives with pimiento.

In past practice, olive stuffing material has been prepared by flame peeling pimiento from which seeds and stems has been removed, then curing in brine, then laying the processed pimiento out flat and cutting it into suitable strips which are then stuffed into the cavities of pitted olives by hand. Such procedure is extremely expensive.

More recently olive pitting and stuffing machines (hereafter referred to as olive stuffing machines) have been available which avoid the hand labor required by older traditional methods but which require a pimiento feed material in the form of a continuous ribbon which is fed continuously to the stuffing machine, cut into strips of suitable size and folded and stuffed into the pitted olives.

For that purpose a ribbon is required which has the desired pimiento flavor and color which is strong enough to resist tearing during handling and feeding to a stuffing machine yet which is not so tough as to be offensive to the feel or taste of the consumer. Further, the ribbon should be uniform in thickness and width, otherwise folded strips of the ribbon, as cut and folded by the stuffing machine, will be overly large (hence will not stuff properly) or overly small (hence will be loose in the cavities of the pitted olives). Faulty ribbon leads to an unacceptable proportion of rejected stuffed olives.

There has been provided a pimiento ribbon which, to the best of our knowledge, is prepared by reconstituting (i.e., by adding water to) dehydrated pimiento, then forming into a ribbon with the aid of sodium alginate, starch, a gum and calcium chloride. However, that ribbon lacks the uniformity required for stuffing olives and its presently very expensive.

It is an object of the present invention to provide improved apparatus and method for forming a fluid, e.g., paste-like food material into a ribbon which is uniform and is suitable, for example, for use as a feed to an olive stuffing machine.

The above and other objects will be apparent from the ensuing description and the appended claims.

The following detailed description is that of a prepared pimiento material in ribbon form for stuffing olives. It will be apparent that the principles of the invention are applicable to similar processing of a large variety of other food materials such as described below.

Source of Pimiento Material — The pimiento material or ingredient may be fresh pimiento flesh (i.e., the flesh, with or without its skin, after separation from stems and seeds), or it may be canned pimiento flesh or pimiento that has been cured in brine, also frozen pimiento (after thawing) or dehydrated pimiento after reconstitution by adding water, or any other form of pimiento which can be pureed. Pimiento that has been stored in sodium chloride solution (brine) should be desalted by washing with water. Further, the pimiento may be the whole pimiento (minus seeds and stem) or it may be cut into any of various sizes. Canned pimiento as available on the market is suitable. Mixtures of any two or more such varieties of pimiento are suitable.

The pimiento or Spanish pepper is a solanaceous fruit belonging to the same family as tomatoes and egg plant. For stuffing olives it should be red ripe, although it will become apparent the invention is applicable to green pimiento.

Pureeing of Pimiento — The pimiento is pureed in any suitable manner, e.g., in what is known as a Fitz mill, the disintegrated flesh being forced through a screen, e.g., a 0.040 inch mesh screen.

Preparation of Material from Pureed Pimiento — This pureed pimiento is mixed, preferably in the manner described below, with a soluble, food grade alginate and with a food grade thickener such as a modified starch and/or a vegetable gum.

The mixture also includes an acid which may be provided by the pimiento itself but is usually and preferably added and is, of course, an acceptable food additive such as citric acid and/or lactic acid. Flavor and preservative (food-grade) are added as desired.

The product so prepared is a viscous material somewhat like tomato paste in a form which can be supplied through a metering pump to a feed nozzle for ejection onto a casting wheel as described below with reference to the drawings. This paste may be extruded onto a casting wheel at room temperature or at a moderately elevated temperature, e.g., 120° F.

A preferred formulation and procedure are as follows:

|  | Ingredient | Amount (Percent by Weight) |
|---|---|---|
| (1) | Water (tap) | 53.6 |
| (2) | Pimiento | |
|  | (a) Desalted | 20 |
|  | (b) Canned | 20 |
| (3) | Sodium alginate | 2.4 |
| (4) | Modified starch | 1.7 |
| (5) | Guar gum | 0.85 |
| (6) | Lactic acid (88%) | 1.00 |
| (7) | Citric acid | 0.2 |
| (8) | Pimiento flavor | 0.15 |
| (9) | Preservative (potassium sorbate) | 0.05 |
| (10) | Vitamin C | 0.05 |
|  | Total | 100.00 |

The pimiento ingredients 2(a) and 2(b) were, respectively, commercially available pimiento cured in brine and desalted by thoroughly washing with water and canned pimiento. The mixture was placed in a Fitz mill and forced through a 0.040 inch screen to provide a puree.

The citric acid, vitamin C and potassium sorbate (used as a preservative), were added to the water at 200° F.) in a ribbon blender. The alginate, starch and gum were blended dry and the resulting dry blend was added slowly to the water containing the citric acid, vitamin C and sorbate, with the blender in motion. A uniform blend was produced to which the pureed pimiento was added. Then, lactic acid and flavor were added. The blender was continued in operation to provide a uniform blend having a consistency similar to that of tomato paste.

This mixture is then placed in a tank which is pressurized by air to 20 psi and metered through a pump to a casting wheel. Apparatus suitable for the purpose and more generally for forming ribbons from gellable fluid food material is illustrated in the accompanying drawings. In these drawings:

FIG. 3 is a perspective view of the casting apparatus shown in more detail than in FIG. 2;

FIG. 4 is an edge view of one of the casting wheels employed in the apparatus of FIGS. 2 and 3;

FIGS. 5 and 6 are side elevation and end (as seen from the right of FIG. 5) views, respectively, of a feed nozzle;

Figures 1, 2:
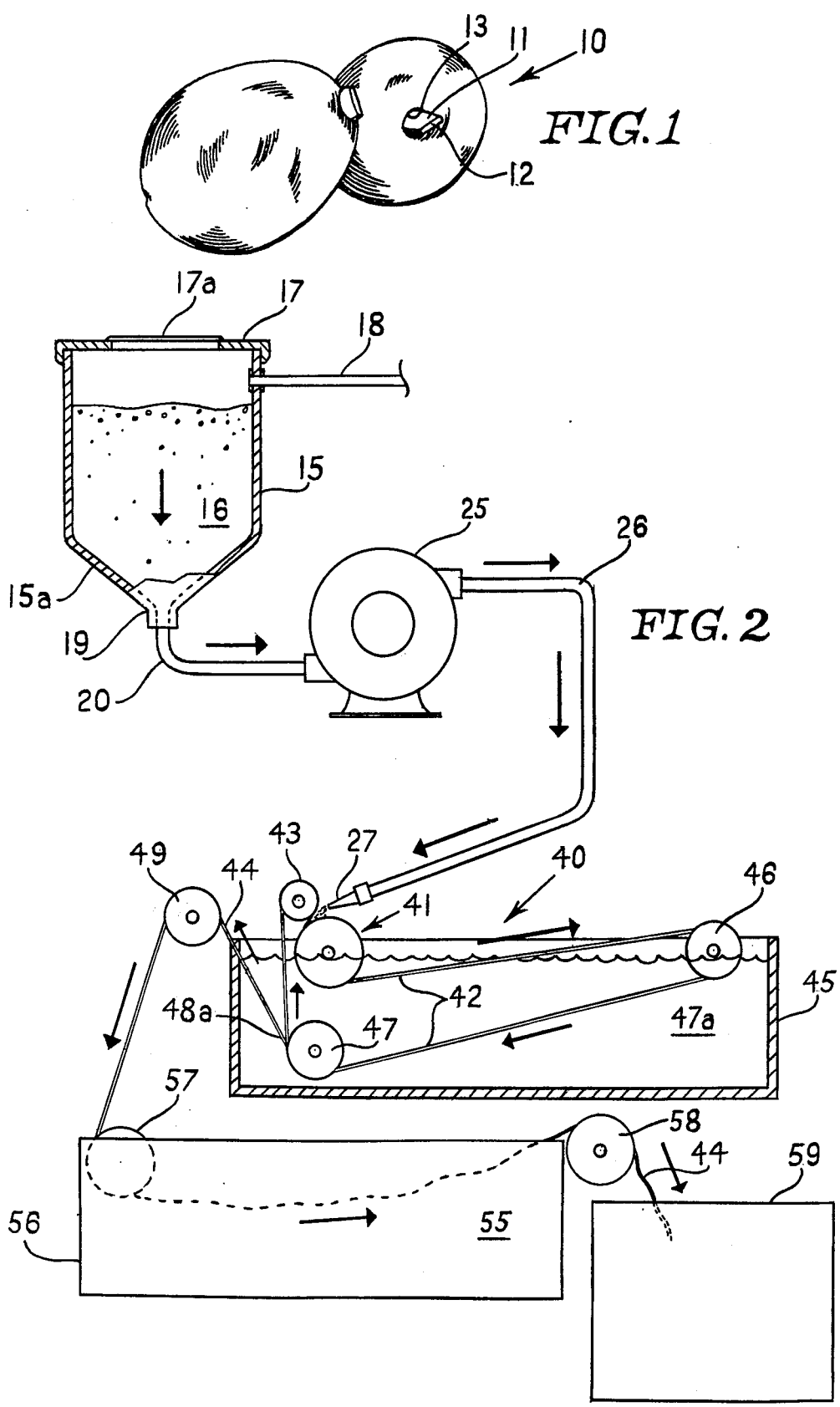
FIG. 1 is a perspective view of stuffed olives.
FIG. 2 is a diagrammatic view of equipment illustrating also a process for preparing the stuffing material in the form of a strip or ribbon.

Referring now to FIG. 1, typical stuffed olives are there shown, being designated generally by the reference numeral 10 and comprising stuffing material 11 in cavities 12 formed by an olive pitting machine. As stated above, the machine used for stuffing is preferably a combined pitting and stuffing machine which both pits the olives, thereby forming the cavities 11 and cutting the ribbon of stuffing material into slices, and folding the slices to form the stuffing 12.

Referring now to FIG. 2, apparatus is there shown which is generally designated by the reference numeral 14. This apparatus comprises a tank 15 containing stuffing material 16 which is prepared as described herein below. The tank is provided with a cover 17 with a removable lid 17a through which the stuffing material 16 is introduced. A pipe is shown at 18 through which air or other gas under pressure is introduced into the tank to pressurize the contents of the tank. The tank has a conical bottom 15 a and an outlet tube 19 connected to a line 20 which is connected to the inlet of a metering pump 25. The metering pump may be of any suitable design, a number of which are well known, which meters the stuffing material 16 and feeds it at a controlled rate (depending upon the speed of the pump) to an outlet line 26, thence to a feed nozzle 27.

The nozzle 27 is shown in FIGS. 5 and 6. It has a threaded body 28, a tapered tip 29, a tapered passage 30 and a rectangular passage 31. Although the shape and dimensions of the passage 31 conform generally to the shape and dimensions of the ribbon 44 of stuffing material (see below) such is not essential, the nozzle 27 being merely a feed control device and the ribbon 44 being shaped as explained below.

Apparatus generally designated by the reference numeral 40 receives and processes the stuffing material ejected by the nozzle 27. This equipment includes a casting wheel 41, details of which are shown in FIG. 4, and are described herein below. A continuous belt 42 is provided which is of a suitable width and thickness and may be constructed of any suitable material. A typical width is 3 inches and a typical thickness is ⅛ inch, and a typical material is a plastic covered fabric of food grade.

This belt 42 is guided over an idler wheel 43 to the casting wheel 41 and stuffing material 16 is ejected by the nozzle 27 into the angle or nip between the belt 42 and casting wheel 41 so that it forms a layer or strip on the wheel. That layer is shown in cross section at 44 in FIG. 4 and in edge view in FIG. 2 detached from the belt 42. The belt 42 travels around the casting wheel 41 downwards into and then upwardly out of a tank 45 to a drive wheel 46, thence downwardly again into the tank to another guide wheel 47 and up again to the idler wheel or pulley 43. The tank 45 is filled with a suitable calcium chloride solution such as that described herein below, the solution being indicated by the reference numeral 47a.

The ribbon 44, by this time suitably set and hardened, is separtaed from the belt 42 at 48a and it passes over a guide wheel 49 and into a second body of calcium chloride solution 55 in a tank 56. A roller 57 guides the ribbon or strip 44 into the bath 55, giving the ribbon its final cure. The ribbon 44 passes out of this bath over a wheel 58 into a holding container 59 for subsequent processing in an olive stuffing machine such as is referred to hereinabove.

Referring now to FIG. 4, the casting wheel 41 rotates freely on shaft 60. Its components are belt guides 61, side plates 62 having shoulders 63 and knife edges 64, a ring 65 and a spacer plate 66. The spacer plate is selected to space the belt guides apart to fit the belt 42. The side plates 62 fit within the ring 65, the knife edges 64 project above the ring 65 to define the initial thickness of the ribbon 44 and the spacing of the knife edges define the initial width of the ribbon 44, which can be varied by using rings 65 of different widths. The final thickness and width of the ribbon 44 will depend upon the shrinkage of the ribbon. The knife edges also serve to trim away excess material 16.

The ribbon 44 is indicated in FIG. 2 as clinging to the belt 42, but in actual fact it floats in the calcium chloride solution and the action of the belt is largely that of forming the ribbon in conjunction with the casting wheel 41 and of guiding it through the solution.

The calcium chloride solution in tank 45 is chilled, e.g., to 40° F., and is a 7 to 10% $CaCl_2$ solution having a pH close to 7. The ribbon 44 has acid components (citric and lactic acids) which serve to convert the alginate to alginic acid. To the extent that the acids are leached out of the ribbon 44 by the calcium chloride solution they diminish the pH of the solution. Therefore, it is desirable to remove some of the calcium chloride solution and to replenish it with fresh solution, which may be carried out continuously or discontinuously to maintain the pH at about 5.5 to 7.

The solution in tank 56 is at room temperature and is a 6 to 10% $CaCl_2$ solution. Its pH is kept at not less than 5, e.g., about 6, by removal and replenishment either continuously or discontinuously.

The action of the solution in tank 45 is to gel and harden the outer layers of the ribbon by converting the alginic acid to calcium alginate, then gel and harden the interior of the ribbon by the same mechanism. The reduced temperature of the solution in tank 45 also acts to congeal the paste as it enters the solution on the casting wheel 41 so that it will remain on or close to the undersurface of the upper reach of the belt 42. By the time the ribbon reaches the lower reach of the belt it is sufficiently hardened so that it will float and retain its shape.

The citric and lactic acids provide acidity to convert the alginate to alginic acid and they also sequester the calcium in the solution so that it does not act too quickly on the alginic acid (which is the gelling, hardening or setting reaction). A fast reaction of the calcium ions with the alginate tends to form a tough, impenetrable film or skin on the surfaces of the ribbon which precludes or unduly retards penetration of the calcium ions into the interior of the ribbon, therefore interferes with proper curing of the ribbon. Further, overly fast reaction of the calcium ions with the ribbon tends to cause exterior dehydration and deformation of the ribbon.

Desirably, the ribbon 44 has a tear strength of 150 to 300 grams measured as follows: A ¼-inch strip is cut from the ribbon and held by a Chatillon pressure tester and the free ends are then pulled until the strip tears. The force at tear, read in grams, is noted. The Chatillon tester is well known in the food processing industry and is normally used to measure softness or penetrability but it is adapted to measure pull and tear. Ribbon prepared from the material and by the method of the present invention has a tear strength, so measured, of about 150 to 300 grams, as compared to a competitive ribbon having a tear strength, similarly measured, less than 150. Greater tear strengths are not needed and may result in a ribbon which is too tough.

The return feature shown in FIG. 2 wherein the ribbon passes twice through the solution in tank 45 is convenient from the standpoint of size, but a longer tank with no return of the ribbon may be employed.

As shown in FIG. 3, the tank 45 is supported on legs 46a and at one end (the right-hand end as viewed in FIG. 3), it will be seen that the shaft 60 carries three casting wheels 41 which are free wheeling on this shaft. The number of casting wheels will, of course, vary according to needs and preferences. At the other end the guide wheels 46 are shown supported on shafts 80. Variable speed drive motors 81 are supported on a table 82 which drive the several shafts 80 and the guide wheels 46 at the desired rate. This rate determines the rate of ribbon formation and is coordinated with the speed of metering pump 25.

Reverting now to the formulation of the material 16, the basic ingredient or substrate is pimiento flesh. By pimiento flesh is meant the shell surrounding the seeds and interior portion and which in turn is covered by a skin. The skin may be removed, but it is preferred to retain it.

The alginate employed in the formulation set forth above was a product of Kelco Company of San Diego, Calif., known as Keltone. It is a low calcium sodium alginate. As is well known, alginates are salts of alginic acid and include sodium, potassium, ammonium and magnesium salts or salts formed by alginic acid with other cations that do not precipitate the alginic acid in aqueous media. Alginic acid is derived from kelp and is a polysaccharide, more particularly believed to be largely copolymers of mannuronic acid and guluronic acid, the polymer chains being interbonded by water molecules. For purposes of the present invention, any water soluble alginate may be used which is acceptable as a food additive, but sodium alginate is preferred.

The gum and starch serve as thickening agents. The gum also confers a resilience to the ribbon which is helpful in that it allows the folded strips cut from the ribbon to be stuffed into the cavities of olives under compression and to expand within the cavities and be firmly held in the cavities. Any food grade vegetable gum which is capable of acting as a thickening agent may be used. The starch (ingredient 4) was a product of National Starch and Chemical Corporation of 750 Third Avenue, New York, N.Y., known as Instant Cleajel, and is described in literature of that company as a pregelatinized, modified and stabilized waxy maize food starch which thickens instantly in cold water. The particular gum used (guar gum) is obtained from the endosperm of seeds of the plant *cyanopsis tetragonalobus*. The gum and starch may be omitted where the material is thick enough without them but they are preferably present in the material.

The ribbon thus produced has a number of advantages including the following: It is dimensionally stable. As noted above, it undergoes shrinkage but the ribbon coming from the tank 56 is uniform in width and thickness; therefore, allowance can be made for shrinkage. It has an adequate (150 to 300 grams) and uniform tear strength and it is free of discontinuities, voids, thin spots and lumps. It has the proper texture for olive stuffing and it has good storage properties, e.g., it does not deteriorate on storage and in the olives and it retains its good qualities in olives over long periods of time.

As noted above, many other food products may be formed into a paste and formed into a ribbon or into other shapes, e.g., into chunks or spheres for inclusion in a variety of food products. Examples of suitable food products other than pimiento, i.e., food products which can be pureed, are all manner of peppers, e.g., bell peppers and chili peppers; onions, celery, carrots, tomatoes, potatoes, cheese Such food products (and mixtures of two or more of them) are pureed, mixed with an alginate and with thickeners if desired, then set and hardened in a calcium chloride solution, a suitable acidifier and calcium sequestering agent such as citric and/or lactic acid also being added, also flavor, food dye, preservatives, etc., as desired. The pasty material formed from the puree and added materials may be shaped into a ribbon by the apparatus and method described, it may be cast in the form of chunks or pellets by suitable apparatus, etc., and it may then be treated with calcium chloride solution to set and harden the shaped material.

SOME GENERAL OBSERVATIONS

Generally stated, the food product to be gelled, and to be cast into the form of a ribbon, or extruded or otherwise shaped to the desired shape, is a viscous, gellable material which may require casting at an elevated temperature, e.g., 120° F. or it may be sufficiently fluid at room temperature to be cast at such temperature. The proportions of ingredients may vary between fairly wide limits and the pH may also vary, e.g., as follows:

| Pureed food material | 20 | to | 80 | % by weight |
| --- | --- | --- | --- | --- |
| Alginate | 2 | to | 4 | % by weight |
| Thickeners | 1 | to | 4 | % by weight |
| pH | 2.5 | to | 4.5 | |

It will therefore be apparent that new and useful food products have been provided.

We claim:

1. Apparatus for continuously producing a ribbon of gelled food material, such ribbon having a uniform thickness and width, said food material as introduced into the apparatus being liquid and being capable of gelling on contact with an aqueous solution of a gelling agent, said apparatus comprising:

(a) a vessel containing a body of liquid aqueous gelling agent
   (b) a casting wheel having a circumferential groove having a width and a depth adapted to form a ribbon of the desired width and thickness, said wheel being mounted for rotation about a horizontal axis with its lower portion submerged in said body of liquid and its upper portion above the upper surface of said liquid
   (c) an endless belt supported for movement in a closed path, said path including:
      (1) first portion converging with the periphery of said wheel above the liquid level in said vessel,
      (2) a second portion in peripheral contact with said wheel and overlying said peripheral groove to form a mold bounded by the wheel and the belt, said second portion extending from the point of convergence of the belt and wheel down into the body of liquid gelling agent, (3) a third portion diverging from said casting wheel at a point below the upper surface of said liquid gelling agent and extending for a distance submerged in said liquid sufficiently to harden the surface of the ribbon, and (4) a fourth, return portion to said point of convergence (d) means continuously rotating said casting wheel and continuously moving said belt in its closed path and (e) means continuously supplying said liquid food material to said casting wheel in proximity to said point of convergence.

2. The apparatus of claim 1 wherein said body of liquid gelling agent is chilled below room temperature sufficiently to cause a rapid congealing of the ribbon of food material on said casting wheel and in said solution.

* * * * *